US012163465B1

(12) United States Patent
Chukrallah et al.

(10) Patent No.: US 12,163,465 B1
(45) Date of Patent: Dec. 10, 2024

(54) TURBINE ENGINE WITH COUPLABLE ROTATING ASSEMBLIES

(71) Applicant: RTX Corporation, Farmington, CT (US)

(72) Inventors: Sami Chukrallah, West Palm Beach, FL (US); Joshua R. Seyler, Stuart, FL (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 18/377,128

(22) Filed: Oct. 5, 2023

(51) Int. Cl.
*F02C 7/36* (2006.01)
*F02C 3/113* (2006.01)

(52) U.S. Cl.
CPC ............... *F02C 3/113* (2013.01); *F02C 7/36* (2013.01)

(58) Field of Classification Search
CPC .............. F02C 3/113; F02C 7/36; F02C 3/10
See application file for complete search history.

(56) References Cited

U.S. PATENT DOCUMENTS

| | | |
|---|---|---|
| 6,865,891 B2 | 3/2005 | Walsh |
| 7,111,462 B2 | 9/2006 | Epstein |
| 11,668,245 B2 | 6/2023 | Plante |
| 2010/0310356 A1 | 12/2010 | Swintek |
| 2018/0058246 A1* | 3/2018 | Keenan .................. F01D 9/042 |
| 2021/0102499 A1* | 4/2021 | Leque ..................... F16H 3/46 |
| 2023/0407795 A1* | 12/2023 | Sibbach .................. F02C 7/36 |

* cited by examiner

*Primary Examiner* — Todd E Manahan
*Assistant Examiner* — Rodolphe Andre Chabreyrie
(74) *Attorney, Agent, or Firm* — Getz Balich LLC

(57) ABSTRACT

A system is provided for a powerplant. This powerplant system includes a core compressor section, a core combustor section, a core turbine section and a core flowpath extending longitudinally through the core compressor section, the core combustor section and the core turbine section between an inlet into the core flowpath and an exhaust from the core flowpath. The powerplant system also includes a first rotating assembly, a second rotating assembly and a clutch. The first rotating assembly includes a first compressor rotor and a first turbine rotor. The first compressor rotor is arranged in the core compressor section. The first turbine rotor is arranged in the core turbine section. The second rotating assembly includes a second compressor rotor and a second turbine rotor. The second turbine rotor is arranged in the core turbine section. The clutch is configured to selectively couple the first rotating assembly to the second rotating assembly.

11 Claims, 6 Drawing Sheets

TURBINE ENGINE WITH COUPLABLE ROTATING ASSEMBLIES

BACKGROUND OF THE DISCLOSURE

1. Technical Field

This disclosure relates generally to a turbine engine and, more particularly, to operating the turbine engine in various modes.

2. Background Information

A turbine engine such as an auxiliary power unit (APU) for an aircraft may be configured to power one or more mechanical loads as well as provide compressed air to, for example, an environmental control system (ECS) for the aircraft. While known turbine engines have various benefits, there is still room in the art for improvement.

SUMMARY OF THE DISCLOSURE

According to an aspect of the present disclosure, a system is provided for a powerplant. This powerplant system includes a core compressor section, a core combustor section, a core turbine section and a core flowpath extending longitudinally through the core compressor section, the core combustor section and the core turbine section between an inlet into the core flowpath and an exhaust from the core flowpath. The powerplant system also includes a first rotating assembly, a second rotating assembly and a clutch. The first rotating assembly includes a first compressor rotor and a first turbine rotor. The first compressor rotor is arranged in the core compressor section. The first turbine rotor is arranged in the core turbine section. The second rotating assembly includes a second compressor rotor and a second turbine rotor. The second turbine rotor is arranged in the core turbine section. The clutch is configured to selectively couple the first rotating assembly to the second rotating assembly.

According to another aspect of the present disclosure, another system is provided for a powerplant. This powerplant system includes a first rotating assembly, a second rotating assembly and a clutch. The first rotating assembly includes a first compressor rotor and a first turbine rotor. The second rotating assembly includes a second compressor rotor, a second turbine rotor and a second rotating assembly shaft connecting the second compressor rotor to the second turbine rotor. The second rotating assembly shaft projects through a bore of the first rotating assembly. The clutch is configured to rotationally decouple the second rotating assembly from the first rotating assembly during a first mode. The clutch is configured to rotationally couple the second rotating assembly to the first rotating assembly during a second mode.

According to still another aspect of the present disclosure, a method of operation is provided during which a fuel-air mixture is ignited within a combustion chamber to provide combustion products. The combustion products is directed across a first turbine rotor and a second turbine rotor. During first mode, rotation of a driven rotor driven with the first turbine rotor and rotation of a compressor rotor is independently driven with the second turbine rotor. During a second mode, rotation of the driven rotor is driven with the first turbine rotor and the second turbine rotor. The compressor rotor rotates with the second turbine rotor.

The method may also include: disengaging a clutch to decouple the second turbine rotor from a first rotating assembly comprising the first turbine rotor during the first mode; and engaging the clutch to couple the second turbine rotor to the first rotating assembly during the second mode.

The system may also include a flow regulator configured to selectively block and unblock fluid flow to the second compressor rotor.

The system may also include a flow regulator configured to selectively block and unblock fluid flow from the second compressor rotor to the first compressor rotor.

The system may also include a second compressor section and a second flowpath. The second compressor section may include the second compressor rotor. The second flowpath may extend through the second compressor section between an inlet into the second flowpath and an outlet from the second flowpath.

During at least a mode of operation, the second flowpath may be fluidly discrete from the core flowpath.

During at least a mode of operation, the second flowpath may be fluidly coupled with and upstream of the core flowpath.

The system may also include a flow regulator fluidly coupled with and upstream of the second compressor section along the second flowpath. The flow regulator may be configured to regulate air flow received by the second compressor section through the second flowpath from the inlet into the second flowpath.

The flow regulator may be configured to fluidly decouple the second compressor section from the inlet into the second flowpath.

The flow regulator may include a variable vane array.

The system may also include a mechanical load and a drivetrain. The mechanical load may include a driven rotor. The drivetrain may couple the driven rotor to the first rotating assembly.

The system may also include an electric machine and a drivetrain. The electric machine may include an electric machine rotor. The drivetrain may couple the electric machine rotor to the first rotating assembly.

The system may also include a second compressor section and a flow regulator. The second compressor section may include the second compressor rotor. The flow regulator may be configured to reduce or block fluid flow into the second compressor section during a first mode. The flow regulator may be configured to increase or unblock the fluid flow into the second compressor section during a second mode. The clutch may be configured to couple the first rotating assembly to the second rotating assembly during the first mode. The clutch may be configured to uncouple the first rotating assembly from the second rotating assembly during the second mode.

The flow regulator may be configured to reduce or block the fluid flow into the second compressor section during a third mode. The clutch may be configured to uncouple the first rotating assembly from the second rotating assembly during the third mode.

The flow regulator may be configured to increase or unblock the fluid flow into the second compressor section during a third mode. The clutch may be configured to couple the first rotating assembly to the second rotating assembly during the third mode.

The system may also include a second compressor section and a flow regulator. The second compressor section may include the second compressor rotor. The flow regulator may be configured to reduce or block fluid flow into the second compressor section during a first mode. The flow regulator may be configured to increase or unblock the fluid flow into the second compressor section during a second mode. The clutch may be configured to uncouple the first rotating assembly from the second rotating assembly during the first mode. The clutch may be configured to couple the first rotating assembly to the second rotating assembly during the second mode.

The system may also include a second compressor section and a flow regulator. The second compressor section may include the second compressor rotor. The flow regulator may be configured to fluidly uncouple the second compressor section from the core compressor section during a first mode. The flow regulator may be configured to fluidly couple the second compressor section to the core compressor section during a second mode. The clutch may be configured to uncouple the first rotating assembly from the second rotating assembly during the first mode. The clutch may be configured to couple the first rotating assembly to the second rotating assembly during the second mode.

The system may also include a second compressor section and a flow regulator. The second compressor section may include the second compressor rotor. The flow regulator may be configured to block fluid flow into the second compressor section during a first mode and a second mode. The clutch may be configured to uncouple the first rotating assembly from the second rotating assembly during the first mode. The clutch may be configured to couple the first rotating assembly to the second rotating assembly during the second mode.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
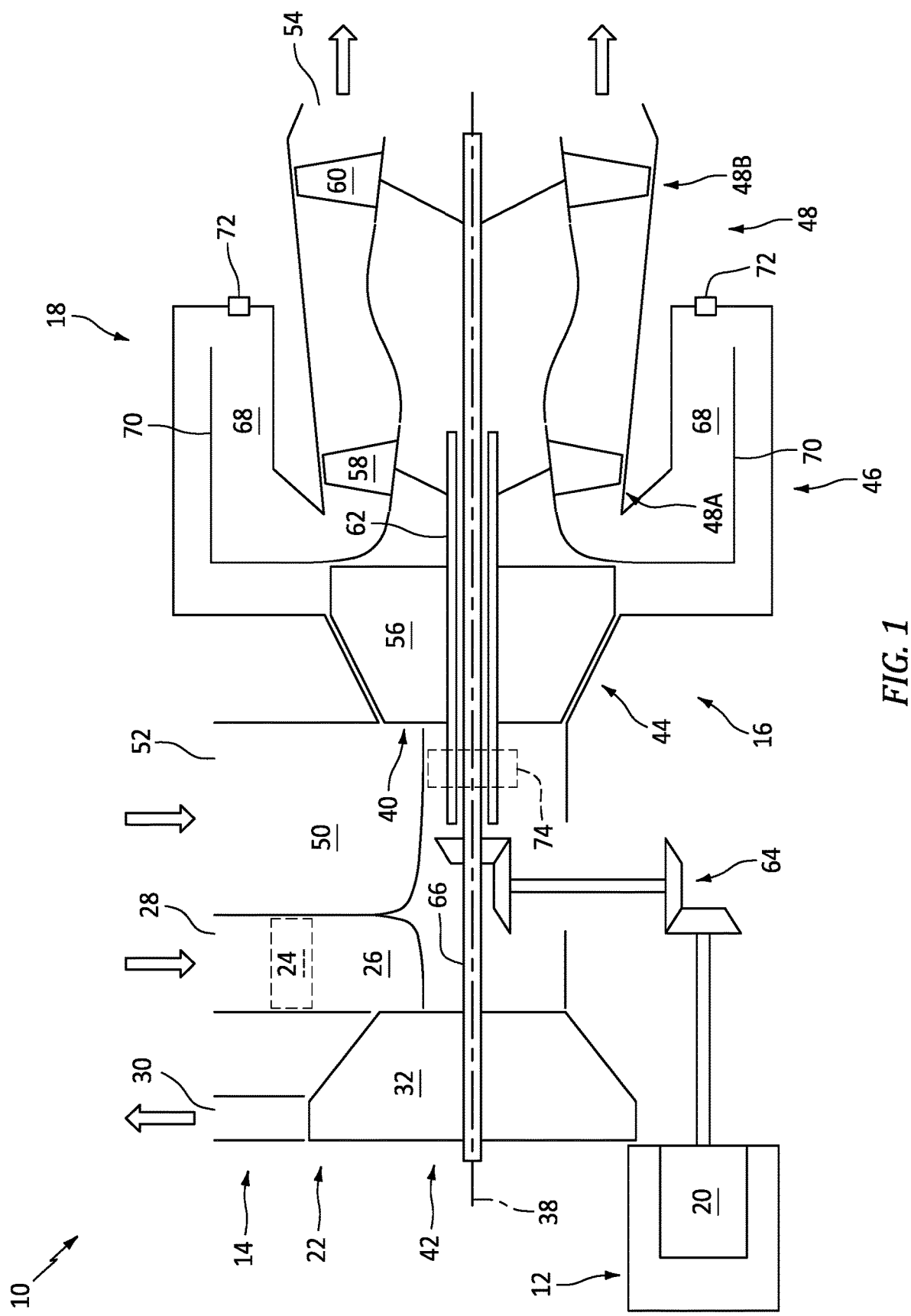
FIG. 1 is a partial schematic illustration of an aircraft system.

FIG. 1 illustrates a system 10 for an aircraft. The aircraft may be an airplane, a helicopter, a drone (e.g., an unmanned aerial vehicle (UAV)) or any other manned or unmanned aerial vehicle or system. The aircraft system 10 may be configured as, or otherwise included as part of, a powerplant for the aircraft. The aircraft system 10 of FIG. 1, for example, includes a powertrain component 12, an air system 14 and a core 16 of a turbine engine 18; e.g., an auxiliary power unit (APU) for the aircraft.

The powertrain component 12 includes a powertrain rotor 20. This powertrain rotor 20 may be a driven rotor where the powertrain component 12 receives power from the engine core 16. The powertrain rotor 20 may be a drive rotor where the powertrain component 12 delivers power to the engine core 16. The powertrain component 12, for example, may be configured as an electric machine. This electric machine may be configurable as an electric generator where the powertrain rotor 20 operates as an internal generator rotor within the electric generator. The electric machine may also or alternatively be configurable as an electric motor where the powertrain rotor 20 operates as an internal motor rotor within the electric motor. In another example, the powertrain component 12 may be configured as a (e.g., hydraulic) fluid pump where the powertrain rotor 20 is a pump rotor; e.g., a pump impeller. In still another example, the powertrain component 12 may be configured as a geartrain (e.g., a power takeoff (PTO) gearbox) where the powertrain rotor 20 is a gear within a gear system of the geartrain. The present disclosure, however, is not limited to such exemplary powertrain component configurations. The powertrain component 12, for example, may alternatively be configured as another type of mechanical load and/or mechanical drive which is operable to receive power from and/or provide power to the engine core 16 and/or another device of the aircraft system 10.

The air system 14 includes a load compressor section 22, an inlet flow regulator 24 and a load compressor flowpath 26. This load compressor flowpath 26 extends (e.g., sequentially) longitudinally through the inlet flow regulator 24 and the load compressor section 22 from an airflow inlet 28 into the load compressor flowpath 26 to a compressed air outlet 30 from the load compressor flowpath 26.

The load compressor section 22 includes a bladed load compressor rotor 32. The load compressor rotor 32 of FIG. 1 is configured as a radial flow compressor rotor; e.g., an axial inflow-radial outflow compressor rotor. The load compressor rotor 32 includes a plurality of compressor blades (e.g., compressor airfoils, compressor vanes, etc.) arranged circumferentially around and connected to at least (or only) one rotor base; e.g., a disk, a hub, etc. The load compressor rotor 32 is disposed in and arranged longitudinally along the load compressor flowpath 26 between the load compressor inlet 28 and the load compressor outlet 30. The compressor blades, for example, are disposed in and extend across the load compressor flowpath 26. The rotor base is disposed adjacent (e.g., radially below) the load compressor flowpath 26. The present disclosure, however, is not limited to the foregoing exemplary load compressor section arrangement. For example, while the load compressor section 22 is schematically shown in FIG. 1 with a single stage, the load compressor section 22 may alternatively include two or more stages. Moreover, while the load compressor rotor 32 is shown as a radial flow compressor rotor, the load compressor rotor 32 may alternatively be configured as an axial flow compressor rotor.

The inlet flow regulator 24 of FIG. 1 is arranged inline along the load compressor flowpath 26 between the load compressor inlet 28 and the load compressor section 22 and its load compressor rotor 32. This inlet flow regulator 24 is configured to regulate air flow received by the load compressor section 22 from the load compressor inlet 28. The inlet flow regulator 24, for example, may (e.g., fully) open such that the air may flow through the load compressor flowpath 26 from the load compressor inlet 28 to the load compressor section 22 (e.g., substantially) unimpeded/unobstructed. The inlet flow regulator 24 may (e.g., fully) close such that the air is blocked/obstructed from flowing through the load compressor flowpath 26 from the load compressor inlet 28 to the load compressor section 22. The inlet flow regulator 24 may (or may not) also meter the flow of the air through the load compressor flowpath 26 from the load compressor inlet 28 to the load compressor section 22, for example, by partially opening/partially closing.

Figure 2B:
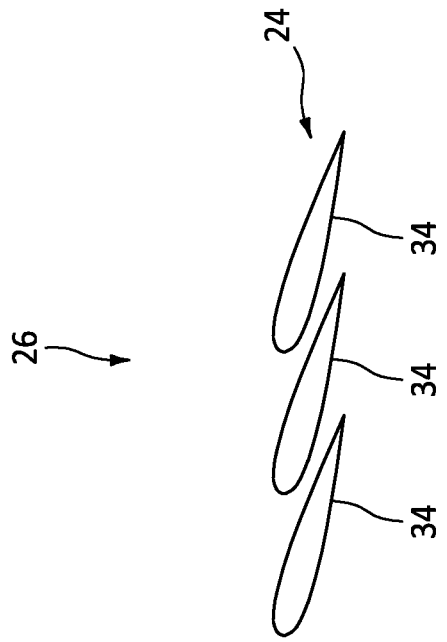
FIGS. 2A-C are partial illustrations of a flow regulator in various positions.
Figure 2C:
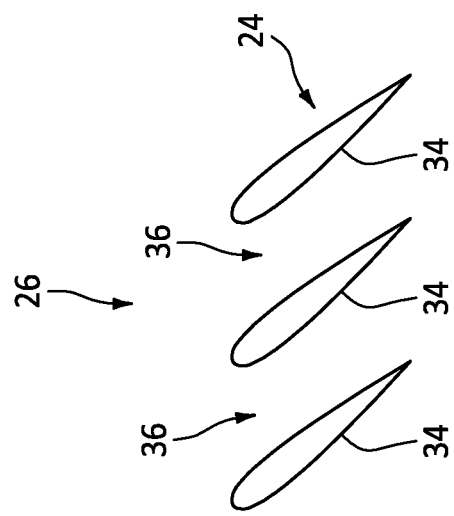
Figure 2A:
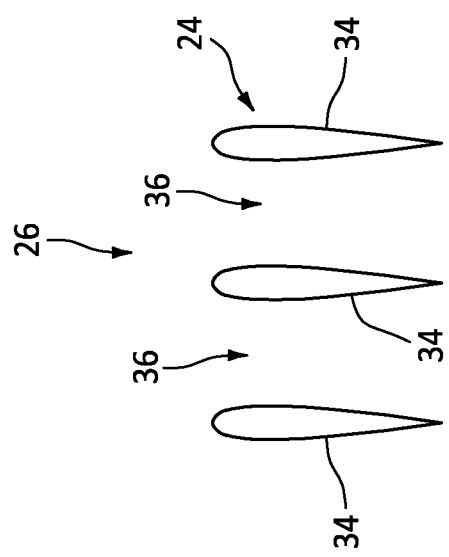

Referring to FIGS. 2A and 2B, the inlet flow regulator 24 may be configured as or otherwise include a variable vane array. The inlet flow regulator 24 of FIGS. 2A and 2B, for example, includes one or more variable stator vanes 34 (only some of which vanes 34 are shown in the figures for ease of illustration). Each of these stator vanes 34 extends spanwise across the load compressor flowpath 26. Each of these stator vanes 34 is configured to move (e.g., pivot) between an open position (e.g., see fully open position of FIG. 2A) and a closed position (e.g., see fully closed position of FIG. 2B). In the open position of FIG. 2A, each laterally adjacent pair of the stator vanes 34 is laterally separated by a gap 36. This gap 36 facilitates flow of the air through the inlet flow regulator 24. In the closed position of FIG. 2B, each stator vane 34 may be (e.g., directly) laterally adjacent, laterally overlap and/or engage (e.g., contact) a laterally adjacent one (or more) of the stator vanes 34. The stator vanes 34 may thereby be arranged to (e.g., completely) close the gap(s) 36 and thereby block/obstruct flow of the air through the inlet flow regulator 24. Of course, referring to FIG. 2C, it is also contemplated the stator vanes 34 may be held (e.g., stopped) at an intermediate position between the open position of FIG. 2A and the closed position of FIG. 2B. Moreover, while the inlet flow regulator 24 is shown in FIGS. 2A-C as the variable vane array, it is contemplated the inlet flow regulator 24 may alternatively be configured as another type of air flow regulator such as a valve.

Referring to FIG. 1, the engine core 16 extends axially along an axis 38 between an upstream end of the engine core 16 and a downstream end of the engine core 16. This axis 38 may be a centerline axis of the turbine engine 18 and/or its engine core 16. The axis 38 may also or alternatively be a rotational axis of one or more rotating assemblies (e.g., 40 and 42) of the turbine engine 18 and its engine core 16. The engine core 16 includes a core compressor section 44, a core combustor section 46, a core turbine section 48 and a core flowpath 50. The core turbine section 48 of FIG. 1 includes a high pressure turbine (HPT) section 48A and a low pressure turbine (LPT) section 48B; e.g., a power turbine (PT) section. The core flowpath 50 extends sequentially through the core compressor section 44, the core combustor section 46, the HPT section 48A and the LPT section 48B from an airflow inlet 52 into the core flowpath 50 to a combustion products exhaust 54 from the core flowpath 50. The core inlet 52 may be disposed at (e.g., on, adjacent or proximate) the upstream end of the engine core 16, and the core exhaust 54 may be disposed at the downstream end of the engine core 16.

The core compressor section 44 includes a bladed core compressor rotor 56. The core compressor rotor 56 of FIG. 1 is configured as a radial flow compressor rotor; e.g., an axial inflow-radial outflow compressor rotor. The core compressor rotor 56 includes a plurality of compressor blades (e.g., compressor airfoils, compressor vanes, etc.) arranged circumferentially around and connected to at least (or only) one rotor base; e.g., a disk, a hub, etc. The core compressor rotor 56 is disposed in and arranged longitudinally along the core flowpath 50 between the core inlet 52 and the core combustor section 46. The compressor blades, for example, are disposed in and extend across the core flowpath 50. The rotor base is disposed adjacent (e.g., radially below) the core flowpath 50. The present disclosure, however, is not limited to the foregoing exemplary core compressor section arrangement. For example, while the core compressor section 44 is schematically shown in FIG. 1 with a single stage, the core compressor section 44 may alternatively include two or more stages. Moreover, while the core compressor rotor 56 is shown as a radial flow compressor rotor, the core compressor rotor 56 may alternatively be configured as an axial flow compressor rotor.

The HPT section 48A includes a blade high pressure turbine (HPT) rotor 58. The HPT rotor 58 of FIG. 1 is configured as an axial flow turbine rotor; e.g., an axial inflow-axial outflow turbine rotor. The HPT rotor 58 includes a plurality of turbine blades (e.g., turbine airfoils, turbine vanes, etc.) arranged circumferentially around and connected to at least (or only) one rotor base; e.g., a disk, a hub, etc. The HPT rotor 58 is disposed in and arranged longitudinally along the core flowpath 50 between the core combustor section 46 and the LPT section 48B. The turbine blades, for example, are disposed in and extend across the core flowpath 50. The rotor base is disposed adjacent (e.g., radially below) the core flowpath 50. The present disclosure, however, is not limited to the foregoing exemplary HPT section arrangement. For example, while the HPT section 48A is schematically shown in FIG. 1 with a single stage, the HPT section 48A may alternatively include two or more stages. Moreover, while the HPT rotor 58 is shown as an axial flow turbine rotor, the HPT rotor 58 may alternatively be configured as a radial flow turbine rotor.

The LPT section 48B includes a blade low pressure turbine (LPT) rotor 60. The LPT rotor 60 of FIG. 1 is configured as an axial flow turbine rotor; e.g., an axial inflow-axial outflow turbine rotor. The LPT rotor 60 includes a plurality of turbine blades (e.g., turbine airfoils, turbine vanes, etc.) arranged circumferentially around and connected to at least (or only) one rotor base; e.g., a disk, a hub, etc. The LPT rotor 60 is disposed in and arranged longitudinally along the core flowpath 50 between the HPT section 48A and the core exhaust 54. The turbine blades, for example, are disposed in and extend across the core flowpath 50. The rotor base is disposed adjacent (e.g., radially below) the core flowpath 50. The present disclosure, however, is not limited to the foregoing exemplary LPT section arrangement. For example, while the LPT section 48B is schematically shown in FIG. 1 with a single stage, the LPT section 48B may alternatively include two or more stages. Moreover, while the LPT rotor 60 is shown as an axial flow turbine rotor, the LPT rotor 60 may alternatively be configured as a radial flow turbine rotor.

The core compressor rotor 56 is coupled to and rotatable with the HPT rotor 58. The core compressor rotor 56 of FIG. 1, for example, is connected to the HPT rotor 58 by a high speed shaft 62. At least (or only) the core compressor rotor 56, the HPT rotor 58 and the high speed shaft 62 collectively form the high speed rotating assembly 40; e.g., a high speed spool. This high speed rotating assembly 40 is also coupled to the powertrain rotor 20 through a drivetrain 64. The drivetrain 64 may be configured as a geared drivetrain, where a geartrain (e.g., a tower shaft assembly, a transmission, a gear system, etc.) is disposed between and operatively couples the powertrain rotor 20 to the high speed rotating assembly 40 and its high speed shaft 62.

The load compressor rotor 32 is coupled to and rotatable with the LPT rotor 60. The load compressor rotor 32 of FIG. 1, for example, is connected to the LPT rotor 60 by a low speed shaft 66. At least (or only) the load compressor rotor 32, the LPT rotor 60 and the low speed shaft 66 collectively form the low speed rotating assembly 42; e.g., a low speed spool.

The low speed rotating assembly 42 may be nested with the high speed rotating assembly 40. The low speed shaft 66 of FIG. 1, for example, projects through an internal bore of the high speed rotating assembly 40 and its high speed shaft 62. With this arrangement, the high speed rotating assembly 40 and each of its members (e.g., 56, 58 and 62) may be arranged axially along the axis 38 between the load compressor rotor 32 and the LPT rotor 60. Each of the rotating assemblies 40, 42 and its members may also be rotatable about the common axis 38. The present disclosure, however, is not limited to such a nested and/or co-axial arrangement. Moreover, the terms "low speed" and "high speed" are used to describe the relative speeds of the rotating assemblies 40 and 42 when the turbine engine 18 and its engine core 16 are up to full speed and the rotating assemblies 40 and 42 are rotating independent of one another. However, as described below in further detail, it is contemplated the rotating assemblies 40 and 42 may alternatively rotate with one another at a common (the same) speed during one or more modes of operation.

During operation of the turbine engine 18, air may enter the engine core 16 through the core inlet 52. This air entering the core flowpath 50 may be referred to as core air. The core air is compressed by the core compressor rotor 56 and directed into a combustion chamber 68 (e.g., an annular combustion chamber) within a combustor 70 (e.g., an annular combustor) of the core combustor section 46. Fuel is injected into the combustion chamber 68 by one or more fuel injectors 72 and mixed with the compressed core air to provide a fuel-air mixture. This fuel-air mixture is ignited and combustion products thereof flow through and sequentially cause the HPT rotor 58 and the LPT rotor 60 to rotate. The rotation of the HPT rotor 58 drives rotation of the core compressor rotor 56 and, thus, the compression of the air received from the core inlet 52. The rotation of the HPT rotor 58 may also mechanically power operation of the powertrain component 12 and drive rotation of its powertrain rotor 20. The rotation of the LPT rotor 60 mechanically powers operation of the load compressor section 22 and drives rotation of its load compressor rotor 32.

The turbine engine 18 and its engine core 16 includes a clutch 74 to facilitate operation of the aircraft system 10 in various modes of operation. This clutch 74 may be configured as an electromagnetic clutch, a hydraulic clutch, a pneumatic clutch or any other mechanically, fluidly and/or electrically actuated clutch. The clutch 74 is configured to selectively couple the low speed rotating assembly 42 with the high speed rotating assembly 40/decouple the low speed rotating assembly 42 from the high speed rotating assembly 40. The clutch 74 of FIG. 1, for example, is configured to operatively couple the high speed shaft 62 to the low speed shaft 66. When the low speed rotating assembly 42 and the high speed rotating assembly 40 are coupled together by the clutch 74, the high speed rotating assembly 40 and the low speed rotating assembly 42 may rotate together at a common (the same) speed. By contrast, when the low speed rotating assembly 42 and the high speed rotating assembly 40 are decoupled by the clutch 74, the low speed rotating assembly 42 rotates independent of the high speed rotating assembly 40 and vice versa. Here, the high speed rotating assembly 40 may rotate at a higher speed than the low speed rotating assembly 42 when the engine core 16 is operating in steady state.

Figure 3:
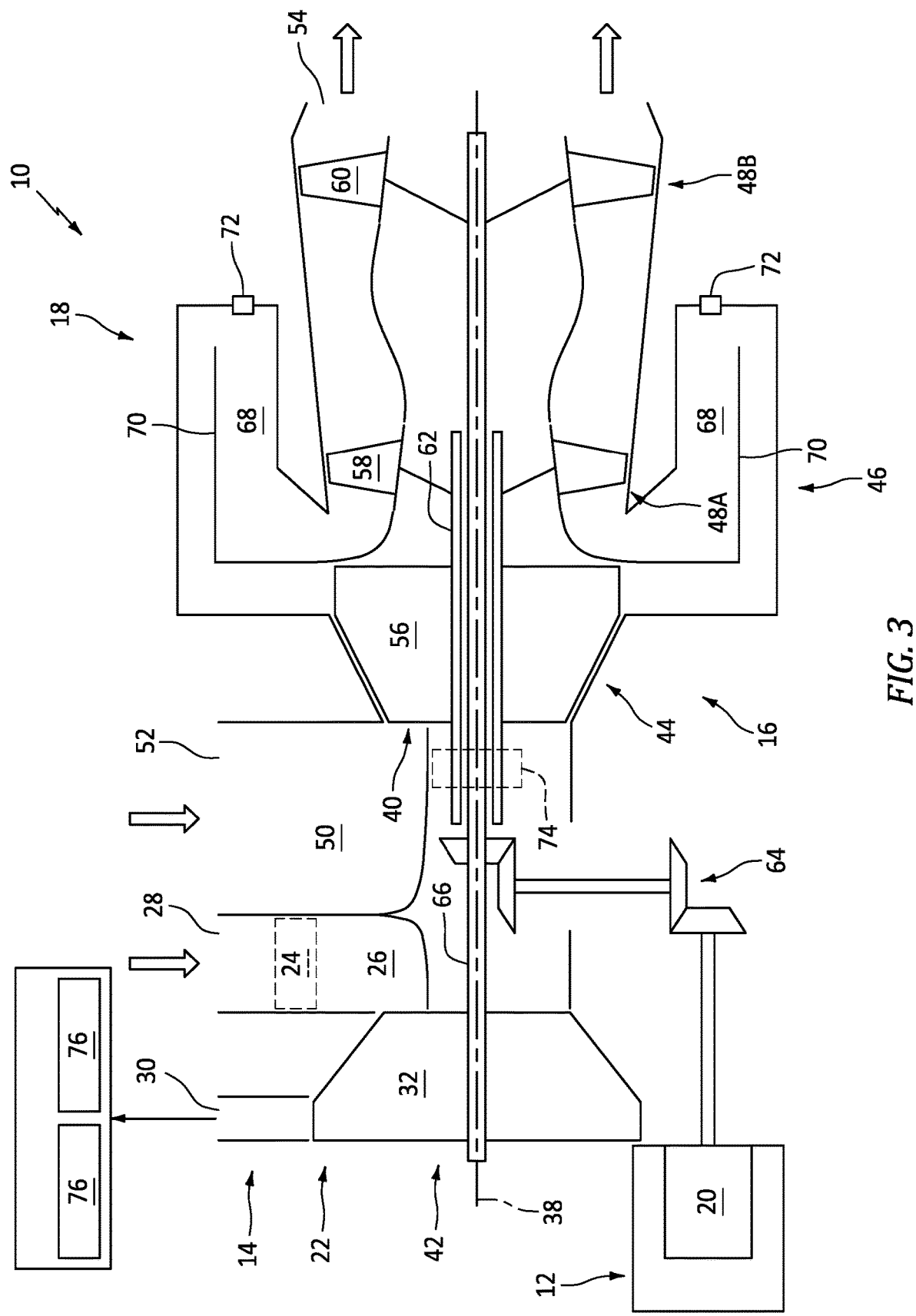
FIGS. 3-6 are partial schematic illustrations of the aircraft system during various modes of operation.

Referring to FIG. 3, during a normal mode of operation, the inlet flow regulator 24 may be arranged in its open position (e.g., see FIG. 2A) and the clutch 74 rotationally decouples the low speed rotating assembly 42 from the high speed rotating assembly 40. The high speed rotating assembly 40 mechanically powers operation of the powertrain component 12 independent of the low speed rotating assembly 42. The HPT rotor 58 of FIG. 3, for example, drives rotation of the powertrain rotor 20. Simultaneously, the low speed rotating assembly 42 mechanically powers operation of the load compressor section 22 independent of the high speed rotating assembly 40. The LPT rotor 60 of FIG. 3, for example, drives rotation of the load compressor rotor 32.

The rotation of the load compressor rotor 32 compresses air received from the load compressor inlet 28, and this compressed air is directed out of the air system 14 through the load compressor outlet 30 to one or more external devices 76. Examples of these external devices 76 include, but are not limited to, one or more devices for an environmental control system (ECS) for the aircraft and/or one or more devices for a main engine starting (MES) system. During this normal operating mode, the aircraft system 10 distributes power generated by the engine core 16 to both the powertrain component 12 and the air system 14.

Figure 4:
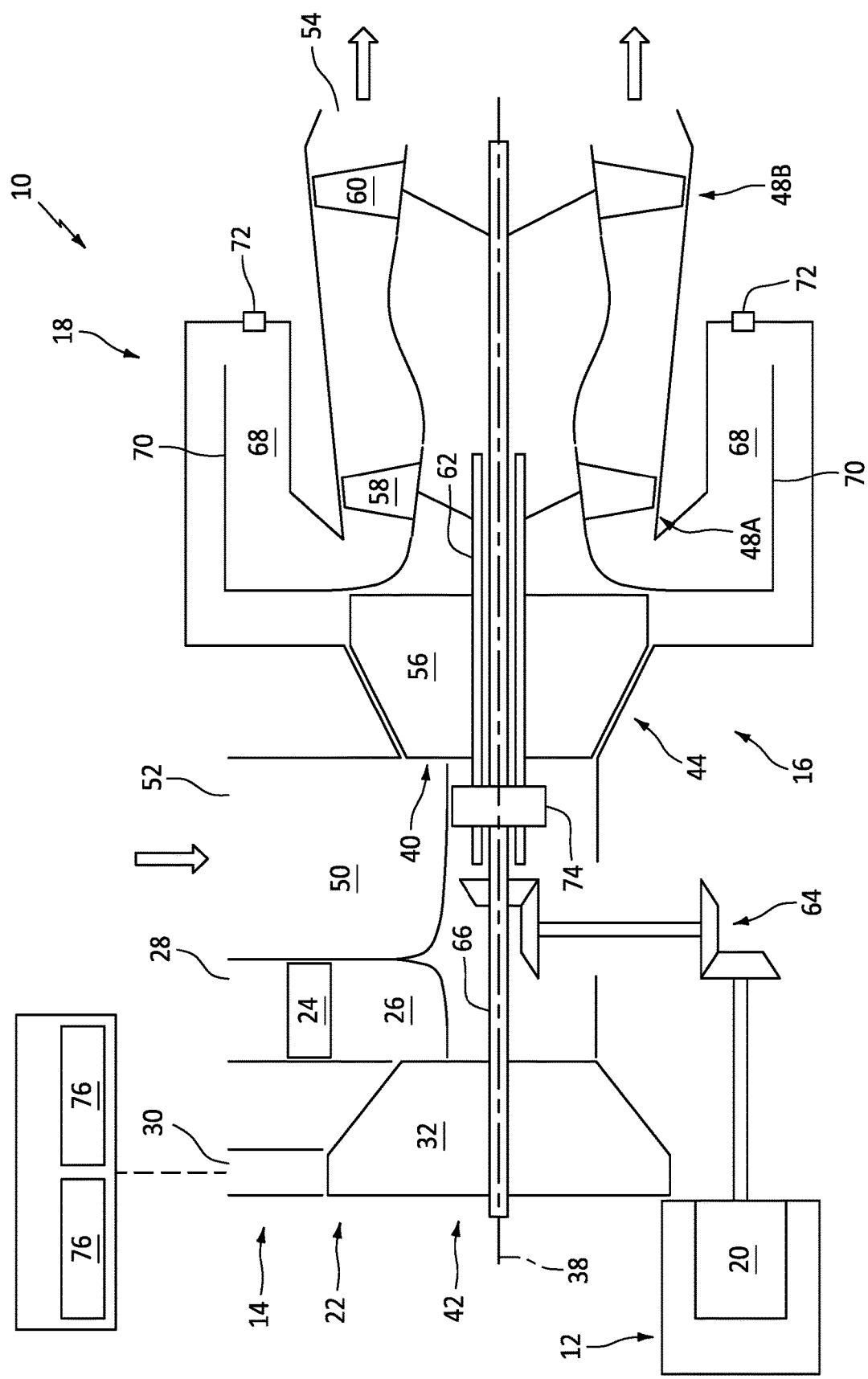

Referring to FIG. 4, during a high power extraction mode of operation, the inlet flow regulator 24 may be arranged in its closed position (e.g., see FIG. 2B) to reduce (e.g., block) the flow of air through the load compressor flowpath 26 from the load compressor inlet 28 to the load compressor section 22. By reducing (e.g., blocking) the flow of air to the load compressor section 22, the load compressor rotor 32 may become substantially unloaded where little or de minimis mechanical power is transferred from the LPT rotor 60 to the load compressor rotor 32. However, the clutch 74 rotationally couples the low speed rotating assembly 42 to the high speed rotating assembly 40. With this arrangement, the rotation of the LPT rotor 60 is operable to boost power to the high speed rotating assembly 40 for driving rotation of the core compressor rotor 56 as well as the powertrain rotor 20. Of course, an intermediate power boost may alternatively be provided by arranging the inlet flow regulator 24 in its intermediate position (e.g., see FIG. 2C) while coupling the low speed rotating assembly 42 to the high speed rotating assembly 40 with the clutch 74.

Figure 5:
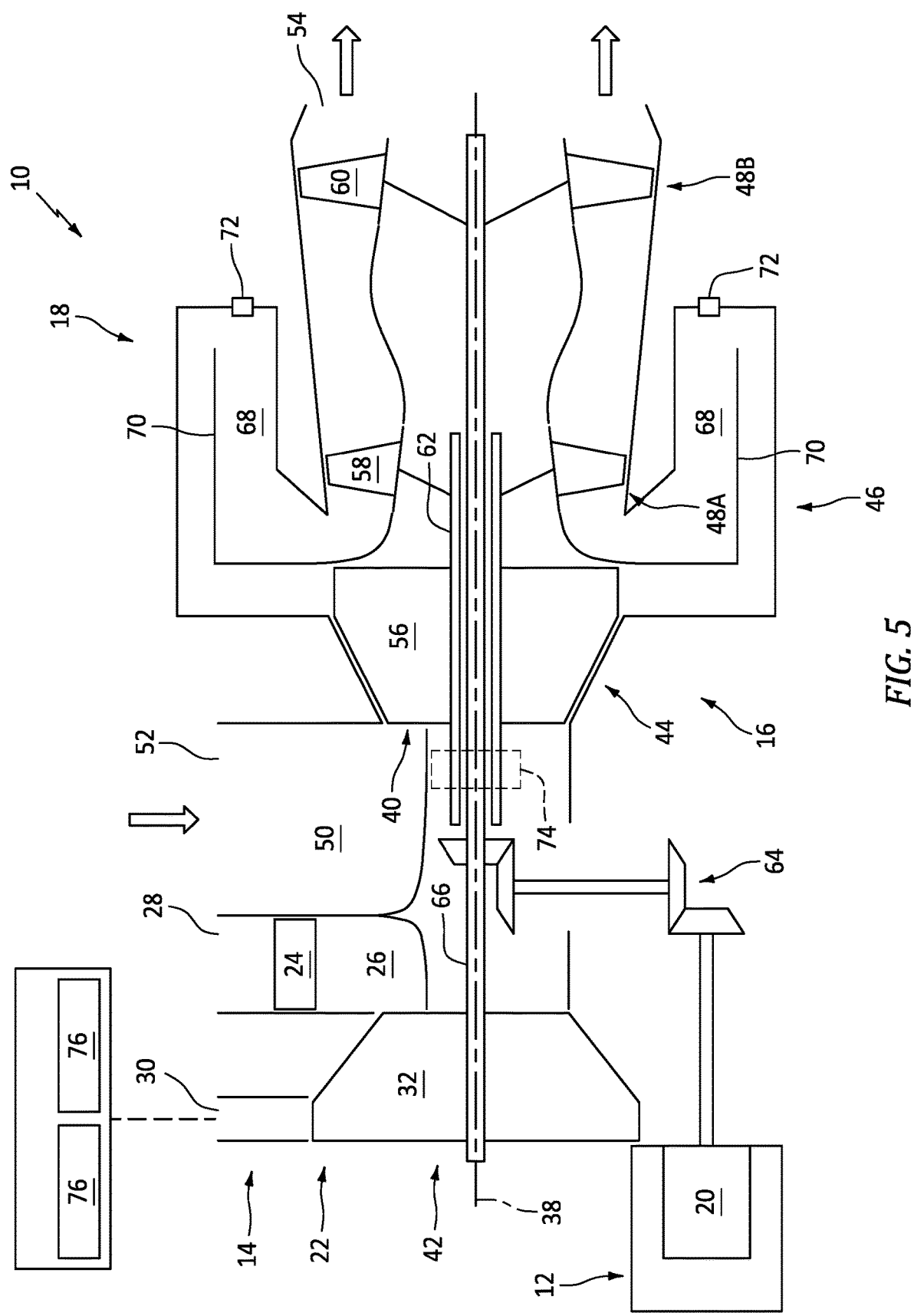

Referring to FIG. 5, during a low power extraction mode of operation, the inlet flow regulator 24 may be arranged in its closed position (e.g., see FIG. 2B) to reduce (e.g., block) the flow of air through the load compressor flowpath 26 from the load compressor inlet 28 to the load compressor section 22. In addition, the clutch 74 rotationally decouples the low speed rotating assembly 42 from the high speed rotating assembly 40. With this arrangement, the low speed rotating assembly 42 may generally freewheel while the low speed rotating assembly 42 continues to power operation of the load compressor section 22 independent of the high speed rotating assembly 40. The LPT rotor 60 of FIG. 5, for example, drives rotation of the load compressor rotor 32. By facilitating freewheeling of the low speed rotating assembly 42, system drag and inertia is reduced for the engine core 16 compared to that associated with the operating modes of FIGS. 3 and 4. The low power extraction operating mode may thereby be utilized for rapid engine starting procedures for the turbine engine 18.

Figure 6:
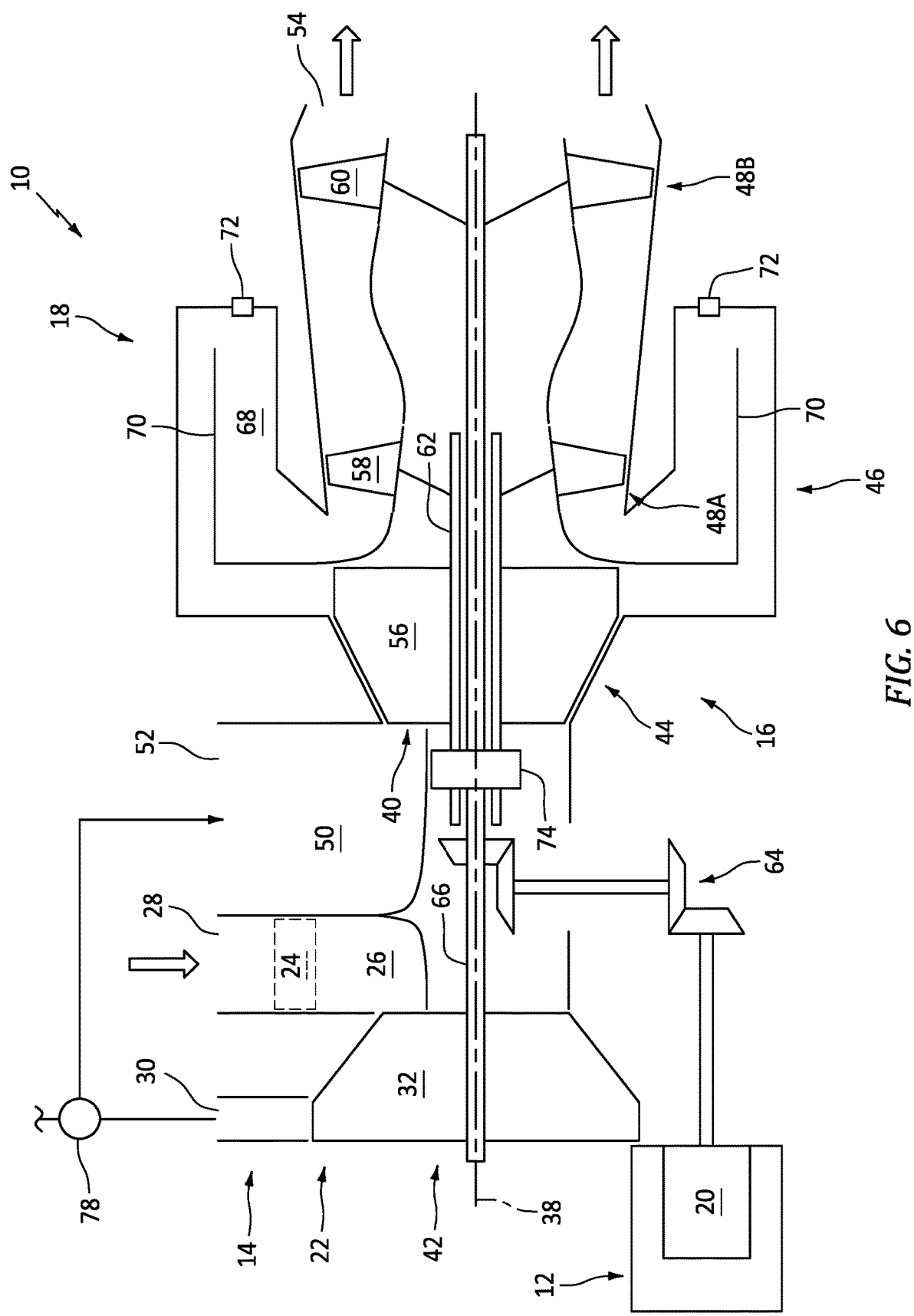

In some embodiments, referring to FIG. 6, the air system 14 may also include an outlet flow regulator 78; e.g., a three-way valve, an arrangement of variable vane arrays, etc. During the modes of FIGS. 3-5, the outlet flow regulator 78 (if included) fluidly couples the load compressor outlet 30 to the one or more external devices 76 (see FIGS. 3-5), and the outlet flow regulator 78 fluidly decouples the load compressor outlet 30 from the core inlet 52. However, during a high altitude start mode of operation, the outlet flow regulator 78 fluidly couples the load compressor outlet 30 to the core inlet 52. The outlet flow regulator 78 may also fluidly decouple the outlet flow regulator 78 from the one or more external devices 76 of FIGS. 3-5 (or reduce compressed air flow to the one or more external devices 76). With this arrangement, the load compressor section 22 of FIG. 6 may function as a low pressure compressor (LPC) section and the core compressor section 44 may function as a high pressure compressor (HPC) section. Here, the inlet flow regulator 24 may be arranged in its open position; e.g., see FIG. 2A. The clutch 74 may also rotationally couple the low speed rotating assembly 42 to the high speed rotating assembly 40 such that rotational power received from the powertrain component 12 (e.g., a starter motor) is provided to both the high speed rotating assembly 40 and the low speed rotating assembly 42.

The aircraft system 10 may include various turbine engine arrangements other than the ones described above. The turbine engine 18, for example, may be configured with two spools (e.g., see FIG. 1), or with more than two spools. The turbine engine 18 may be a direct drive engine or a geared engine. Moreover, while the system 10 is described above with respect to an aircraft system, it is contemplated the turbine engine 18 may alternatively be configured for a non-aircraft application; e.g., an industrial turbine engine, etc.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. A system for a powerplant, comprising:
    a core compressor section, a core combustor section, a core turbine section and a core flowpath extending longitudinally through the core compressor section, the core combustor section and the core turbine section between an inlet into the core flowpath and an exhaust from the core flowpath;
    a first rotating assembly including a first compressor rotor and a first turbine rotor, the first compressor rotor arranged in the core compressor section, and the first turbine rotor arranged in the core turbine section;
    a second rotating assembly including a second compressor rotor and a second turbine rotor, the second turbine rotor arranged in the core turbine section;
    a second compressor section comprising the second compressor rotor;
    a flow regulator configured to reduce or block fluid flow into the second compressor section during a first mode, and the flow regulator configured to increase or unblock the fluid flow into the second compressor section during a second mode; and
    a clutch configured to selectively couple the first rotating assembly to the second rotating assembly, the clutch configured to couple the first rotating assembly to the second rotating assembly during the first mode, and the clutch configured to uncouple the first rotating assembly from the second rotating assembly during the second mode.

2. The system of claim 1, further comprising a second flowpath extending through the second compressor section between an inlet into the second flowpath and an outlet from the second flowpath.

3. The system of claim 2, wherein, during at least a mode of operation, the second flowpath is fluidly coupled with and upstream of the core flowpath.

4. The system of claim 1, wherein the flow regulator comprises a variable vane array.

5. The system of claim 1, further comprising:
    a mechanical load comprising a driven rotor; and
    a drivetrain coupling the driven rotor to the first rotating assembly.

6. The system of claim 1, further comprising:
    an electric machine comprising an electric machine rotor; and
    a drivetrain coupling the electric machine rotor to the first rotating assembly.

7. The system of claim 1, wherein
    the flow regulator is configured to reduce or block the fluid flow into the second compressor section during a third mode; and
    the clutch is configured to uncouple the first rotating assembly from the second rotating assembly during the third mode.

8. The system of claim 1, wherein
    the flow regulator is configured to increase or unblock the fluid flow into the second compressor section during a third mode; and
    the clutch is configured to couple the first rotating assembly to the second rotating assembly during the third mode.

9. A system for a powerplant, comprising:
    a core compressor section, a core combustor section, a core turbine section and a core flowpath extending longitudinally through the core compressor section, the core combustor section and the core turbine section between an inlet into the core flowpath and an exhaust from the core flowpath;
    a first rotating assembly including a first compressor rotor and a first turbine rotor, the first compressor rotor arranged in the core compressor section, and the first turbine rotor arranged in the core turbine section;
    a second rotating assembly including a second compressor rotor and a second turbine rotor, the second turbine rotor arranged in the core turbine section;
    a clutch configured to selectively couple the first rotating assembly to the second rotating assembly;
    a second compressor section comprising the second compressor rotor; and
    a second flowpath extending through the second compressor section between an inlet into the second flowpath and an outlet from the second flowpath, wherein, during at least a mode of operation, the second flowpath is fluidly discrete from the core flowpath.

10. A system for a powerplant, comprising:
    a core compressor section, a core combustor section, a core turbine section and a core flowpath extending longitudinally through the core compressor section, the core combustor section and the core turbine section between an inlet into the core flowpath and an exhaust from the core flowpath;
    a first rotating assembly including a first compressor rotor and a first turbine rotor, the first compressor rotor arranged in the core compressor section, and the first turbine rotor arranged in the core turbine section;
    a second rotating assembly including a second compressor rotor and a second turbine rotor, the second turbine rotor arranged in the core turbine section;
    a second compressor section comprising the second compressor rotor; and
    a flow regulator configured to fluidly uncouple the second compressor section from the core compressor section during a first mode, and the flow regulator configured to fluidly couple the second compressor section to the core compressor section during a second mode; and a clutch configured to selectively couple the first rotating assembly to the second rotating assembly, the clutch configured to uncouple the first rotating assembly from the second rotating assembly during the first mode, and the clutch configured to couple the first rotating assembly to the second rotating assembly during the second mode.

11. A system for a powerplant, comprising:

a core compressor section, a core combustor section, a core turbine section and a core flowpath extending longitudinally through the core compressor section, the core combustor section and the core turbine section between an inlet into the core flowpath and an exhaust from the core flowpath;

a first rotating assembly including a first compressor rotor and a first turbine rotor, the first compressor rotor arranged in the core compressor section, and the first turbine rotor arranged in the core turbine section;

a second rotating assembly including a second compressor rotor and a second turbine rotor, the second turbine rotor arranged in the core turbine section;

a second compressor section comprising the second compressor rotor;

a flow regulator configured to block fluid flow into the second compressor section during a first mode and a second mode; and a clutch configured to selectively couple the first rotating assembly to the second rotating assembly, the clutch configured to uncouple the first rotating assembly from the second rotating assembly during the first mode, and the clutch configured to couple the first rotating assembly to the second rotating assembly during the second mode.

* * * * *